(No Model.)

F. J. J. SCHUETT.
TRACK CLEANER OR DIVIDER FOR MOWING MACHINES.

No. 343,925. Patented June 15, 1886.

Attest:
John Schuman.
S. T. Sprague

Inventor:
Fred. J. J. Schuett.
by his Atty
Thos. S. Sprague

UNITED STATES PATENT OFFICE.

FRED. J. J. SCHUETT, OF BUENA VISTA, MICHIGAN.

TRACK-CLEANER OR DIVIDER FOR MOWING-MACHINES.

SPECIFICATION forming part of Letters Patent No. 343,925, dated June 15, 1886.

Application filed March 18, 1885. Serial No. 159,311. (No model.)

*To all whom it may concern:*

Be it known that I, FRED. J. J. SCHUETT, of Buena Vista, in the county of Saginaw and State of Michigan, have invented new and useful Improvements in Track-Cleaners or Dividers for Mowing-Machines; and I do hereby declare that the following is a full, clear, and exact description thereof, reference being had to the accompanying drawings, which form a part of this specification.

This invention relates to certain new and useful improvements in attachments to mowers, which are attached in such a manner as to form an extension of the track-board and divider point of the shoe, thereby especially adapting the mower for use in higher and heavier grass, forcing the cut grass out of the way of the travel of the team and mower in cutting the swath.

The invention consists in the peculiar construction and combination of the attachment with the shoe of the mower, as more fully hereinafter described.

Figure 1:
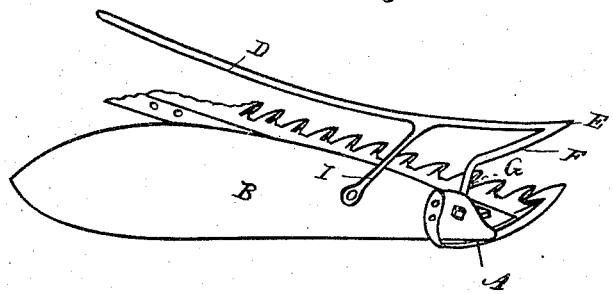
Figure 2:
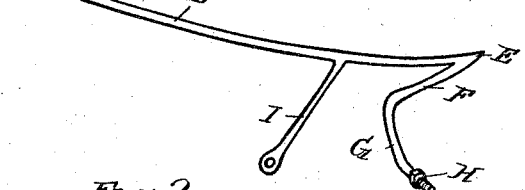
Figure 3:
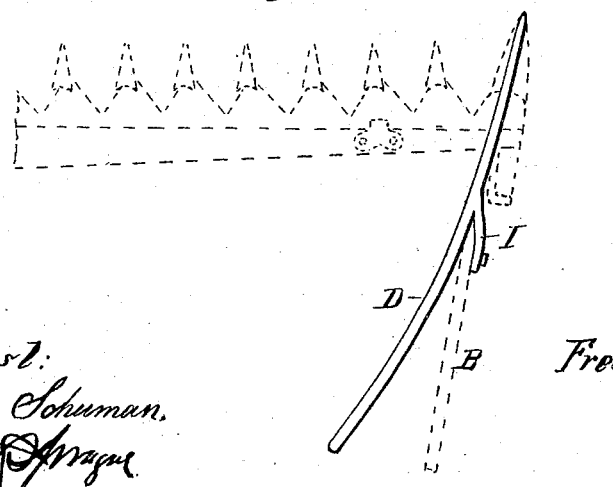

Figure 1 is a perspective view of a section of a mower with my attachment secured thereto. Fig. 2 is a detached view of the attachment. Fig. 3 is a plan.

In the accompanying drawings, which form a part of this specification, A represents the shoe of a mower, such as is usually secured to the free end of the finger-bar of the machine, and to this shoe is attached the track-board B.

My attachment consists of a curved bar, D, terminating in a point, E, from which point extends the brace F and arm G, the lower end of which turns at right angles to the body of the arm outwardly, and is provided with a thread and nut, H, by means of which the device is secured to the shoe, the bolt passing from the inside outwardly through such shoe, and being secured by the nut in such position as to bring the point of my attachment in a vertical line with the dividing-point of the shoe.

I is another brace secured to the curved bar and projecting rearwardly. It is provided with a bolt and nut, by means of which it is attached to the rear end of the shoe on the outside of the track-board, leaving the curved-bar portion of the attachment curving inwardly toward the driving mechanism of the mower.

It will readily be seen that in tall and heavy grass the point of my attachment will divide the section of grass to be operated upon by the advancing cutter-bar at or near the top, or about the same instant of time that the divider point of the shoe separates the same at the bottom, and the peculiar curvature given to the attachment will, in the advance of the machine, throw the cut grass over toward the driving mechanism, and leave it out of the way of the path of the travel on cutting the next swath, while the peculiar manner of securing it to the shoe insures great steadiness, and prevents liability to accidental displacement.

What I claim as my invention is—

A divider attachment to a mowing-machine, comprising in a single piece the curved bar D, terminating in a point, E, brace F, and arm G, extending from said point, the lower end of said arm bent at right angles to said brace and provided with thread and nut, and the brace I, projecting rearwardly from said bar D, and provided with hole to receive a bolt, and the whole adapted to serve substantially as and for the purpose specified.

FRED. J. J. SCHUETT.

Witnesses:
H. S. SPRAGUE,
E. J. SCULLY.